United States Patent [19]

Kennedy et al.

[11] Patent Number: 5,265,456
[45] Date of Patent: Nov. 30, 1993

[54] METHOD OF COLD WORKING HOLES USING A SHAPE MEMORY ALLOY TOOL

[75] Inventors: James R. Kennedy, Huntington; David J. Larson, Jr., Huntington Station, both of N.Y.

[73] Assignee: Grumman Aerospace Corporation, Bethpage, N.Y.

[21] Appl. No.: 905,427

[22] Filed: Jun. 29, 1992

[51] Int. Cl.⁵ .............................................. B23P 11/02
[52] U.S. Cl. ..................................... 72/342.7; 29/447; 72/364
[58] Field of Search ................. 29/447, 524.1; 72/364, 72/342.7, 342.4

[56] References Cited

U.S. PATENT DOCUMENTS

| | | | |
|---|---|---|---|
| 2,575,213 | 11/1951 | Fruth | 29/447 |
| 3,298,096 | 1/1967 | Stuart | 29/447 |
| 3,900,939 | 8/1975 | Greacen | 29/447 |
| 4,433,567 | 2/1984 | Mead . | |
| 4,675,061 | 6/1987 | Mead . | |
| 4,679,292 | 7/1987 | Mead . | |
| 4,701,293 | 10/1987 | Mead . | |
| 4,813,807 | 3/1989 | Mead . | |
| 4,847,962 | 7/1989 | Puetz | 29/447 |
| 4,899,543 | 2/1990 | Romanelli et al. . | |
| 5,120,175 | 6/1990 | Arbegast et al. | 29/447 |

FOREIGN PATENT DOCUMENTS

| | | | |
|---|---|---|---|
| 3037087 | 5/1982 | Fed. Rep. of Germany | 29/447 |
| 3037632 | 5/1982 | Fed. Rep. of Germany | 29/447 |
| 0231208 | 12/1984 | Japan | 29/447 |
| 0317632 | 12/1989 | Japan | 72/342.4 |

OTHER PUBLICATIONS

Champoux, et al., "Fatigue Life Enhancement and High Interference Bushing Installation Using the ForceMate Bushing Installation Technique," Special Technical Publication 927, 1987, Copyright American Society for Testing and Materials 1916 Race St., Philadelphia, Pa. 19103.

Primary Examiner—Lowell A. Larson
Assistant Examiner—Michael J. McKeon
Attorney, Agent, or Firm—Pollock, Vande Sande & Priddy

[57] ABSTRACT

Fatigue lifetime enhancement of the holes formed in structural members occurs by introducing a cold working tool or interference fit fasteners fabricated from shape memory alloy materials. The tool may be employed to expand the wall of a hole while the tool material is raised above the critical transitional temperature. Then, upon lowering the tool material below the critical transitional material, it contracts permitting it to be withdrawn. Bushings and interference fit fasteners may be installed in holes formed in structural members when a shape alloy material bushing or fastener is heated above the critical transitional temperature so that an interference fit results and the hole is cold worked. If the alloy material is not cooled below the critical transitional temperature, the interference fit may be permanently maintained, thereby further enhancing the fatigue life of the members.

1 Claim, 3 Drawing Sheets

METHOD OF COLD WORKING HOLES USING A SHAPE MEMORY ALLOY TOOL

FIELD OF THE INVENTION

The present invention relates to shape memory alloys, and more particularly to the utilization of such materials as tools, fasteners, and bushings received within a machined hole for cold working the hole and/or creating an interference fit and thereby increasing fatigue life of a structural member.

BACKGROUND OF THE INVENTION

Cracking at fastener holes is a major source of fatigue problems in airframe structures. The problem is caused by the intensification of stress that occurs at the edge of a hole during loading. Fatigue lifetime enhancement of a fastener hole is intended to improve the fatigue performance of a structure, hopefully to a level which is comparable to that of the structural material without the presence of holes.

It has long been the practice, in the fabrication and assembly of structures, such as, aircraft and aerospace structures, to first drill or punch holes through the metal through which bolts, rivets, or fasteners are to pass and to then cold work the metal around the hole. Such working stretches the work piece beyond the yield strength of the work piece and increases the fatigue life of the structure about the hole by generating compressive stress gradients within the material about the worked hole. Because the greatest tensile stress concentration from external loading occurs at the hole surface, increased residual compression stress gradients increase the fatigue life of the structure. Fatigue life of the structure is also increased by the introduction of interference fit fasteners (including bolts, pins, rivets, fasteners, and/or bushings) into holes in the structure. The improvement offered by interference fit is caused by a combination of two effects. First, the stress intensity at the hole surface is significantly reduced because of highly effective load transfer through the bolt. Second, depending upon the level of interference, the interference fit bolt induces favorable compressive interference stresses near the bolt hole which prolong fatigue life.

One method heretofore followed in working of drilled or punched holes has been to force a ball (having a diameter slightly larger than the hole) through the hole, enlarging it and compressing the metal around the hole. Rather than using a ball, slotted collars or split sleeves and oversized mandrels have also been employed. In this arrangement, the slotted collar or split sleeve, having a relaxed diameter which will fit through the drilled hole, is placed in the hole, expanded with a slightly oversized mandrel and the mandrel is removed. The slotted collar or split sleeve springs back to its relaxed diameter, is removed from the hole and discarded.

In the instance of the oversized ball and the slotted collar or split sleeve and the oversized mandrel, in addition to compressing, stressing, and increasing the strength and fatigue resistance around the hole, the oversized ball and collar or sleeve, where such collar or sleeve is used, distort or displace the metal. The oversized ball tends to force the metal through as well as radially out of the hole. Thus, the ends of the hole wall are not square and must be subsequently machined or finished. In the case of the slotted collar or split sleeve, a ridge in the hole wall at the collar slot or sleeve split may be formed which must be removed by machining or finishing. Machining or finishing to square the hole wall or remove the ridge in the wall adds to the cost and, to a degree, reduces the advantages attained by working. The likelihood of fatigue-related failures is increased.

In the assignee's previously issued U.S. Pat. No. 4,433,567, a sleeve fabricated from a shape memory alloy is employed with a mandrel for cold working a hole. The sleeve is fabricated from a metal treated to have a memory shape, such as Nitinol, nickel-titanium alloys or copper-zinc-aluminum alloys.

Nitinol is family of nickel-titanium alloys having a chemical composition of from about 53% to 57% by weight of nickel and the balance titanium with small percentages of other elements added to adjust transformation temperature, e.g. iron or cobalt. It was developed by the U.S. Naval Ordnance Laboratory. Copper-zinc-aluminum alloys having about 70% by weight of copper and the balance zinc with small additions of aluminum have been developed by the International Copper Research Association.

BRIEF DESCRIPTION OF THE PRESENT INVENTION

The proposed invention is based upon the use of certain metallic materials, the so-called "shape memory" alloys, which can revert (expand or contract) to their original shape after they have undergone a sequence of plastic deformation and heating. The effect depends upon the thermoelastic martensitic transformation of the material. For example, nickel-titanium (NiTi) shape memory alloys such as Nitinol are preferred. They have transformation temperatures that can be adjusted to occur between approximately $-150°$ and $+100°$ C. ($-238°$ and $+212°$ F.). Such an alloy deformed in the martensitic phase will be restored to the shape that existed in the austenitic phase. Thus, a constraint placed on deformed martensitic materials, such as an NiTi bolt placed in a snug hole, will generate stress and displacement when the material is allowed to heat above its transformation temperature and expand to its original size. Stresses generated during transformation can be extremely high, easily reaching levels greater than 100 ksi. The displacement caused by the bolt can result in permanent cold expansion of the hole and, if the bolt is left in the hole, an interference fit between the two.

The present invention envisions several embodiments, the first of which is a cold working tool fabricated entirely from shape memory alloy material. The tool is inserted into a hole and warmed to expand which causes permanent cold expansion of the hole and a favorable distribution of compressive residual stresses around the hole edge. The cold working tool is removed by cooling it whereupon it contracts for easy withdrawal.

In the second embodiment of the invention, a dual benefit may be imparted to the fatigue life characteristics of a hole. First, instead of a cold working tool as just described, a bushing is inserted into the hole and expanded. However, unlike the tool, the bushing is left in place so as to form a radial interference region between the bushing and the structural member. The cold working of the hole and then subsequent interference fit enhances the fatigue life of the material around the hole.

Finally, the present invention envisions the utilization of other types of interference fit fasteners made from shape memory alloys which combine the advantageous benefits of cold working and interference fit, as just explained in connection with interference bushings.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1A:
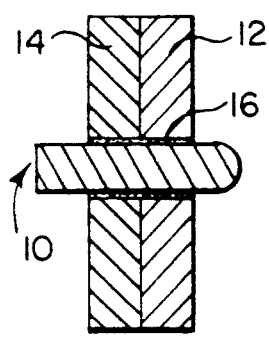
FIGS. 1A–1C are cross-sectional views of a cold working tool being inserted and withdrawn from a hole in a structural member during cold working treatment in accordance with the present invention.
Figure 1B:
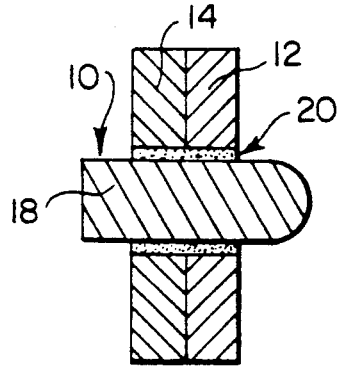
Figure 1C:
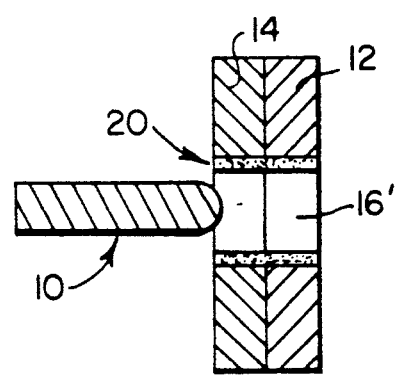

Referring to the figures, and more particularly FIGS. 1A–1C, a first embodiment of the present invention is illustrated as a cold working tool. In FIG. 1A the tool is generally indicated by reference numeral 19 and is seen to include a solid cylindrical member having a rounded end for permitting easy entry of the tool into coaxially located holes 16 in two structural plates 12 and 14. The body of the tool is fabricated of shape memory alloy, of the type previously discussed and is inserted through the holes 16 when the shape memory alloy material is below the critical transition temperature of the alloy. As indicated in FIG. 1A, the outer diameter of the tool is smaller than the diameter of the hole.

In FIG. 1B the tool is illustrated in the inserted position and indicates an enlarged diameter as a result or warming the tool alloy material above the critical transition temperature. As a result, the tool becomes enlarged, as indicated by reference numeral 18 and deforms the wall of the hole 16 so as to form a cold worked region, generally indicated by reference numeral 20. In order to remove the tool from the cold worked hole, it is necessary to cool the shape memory alloy material of the tool below the critical transition temperature so that it approaches the size it had upon insertion (FIG. 1A), which allows the tool 10 to be withdrawn from the enlarged cold worked holes 16', as indicated in FIG. 1C. The result of the cold working is a desirable enhancement of fatigue life.

Figure 2A:
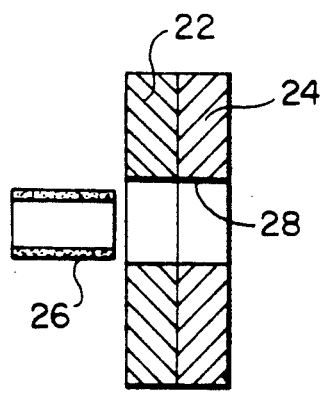
FIGS. 2A and 2B are cross sectional views illustrating the insertion of a shape memory alloy interference bushing into a hole formed in a structural member.
Figure 2B:
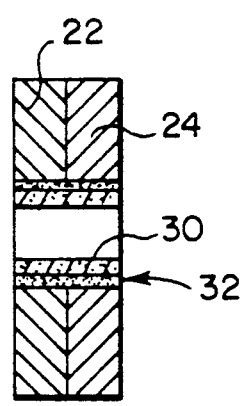

FIGS. 2A and 2B illustrate a second embodiment of the present invention wherein a bushing 26, fabricated from the discussed shape memory alloy material, becomes inserted within coaxially aligned holes 28 in structural members 22 and 24. In FIG. 2A the outer diameter of the bushing is less than the diameter of the holes 28 while the shape memory alloy material of the bushing remains below the critical transition temperature. This allows the bushing to be slipped into the holes. Then, the temperature of the shape memory alloy material is raised above the critical transition temperature so that the bushing expands, as indicated by reference numeral 30 and an interference fit results between the bushing and the holes. Expansion of the bushing causes cold working in the wall area around the holes and is generally indicated as the interference region 32. This cold worked region enhances the fatigue life of the structural members 22, 24 as does the existence of the interference bushing 26 in the cold worked hole.

Figure 3A:
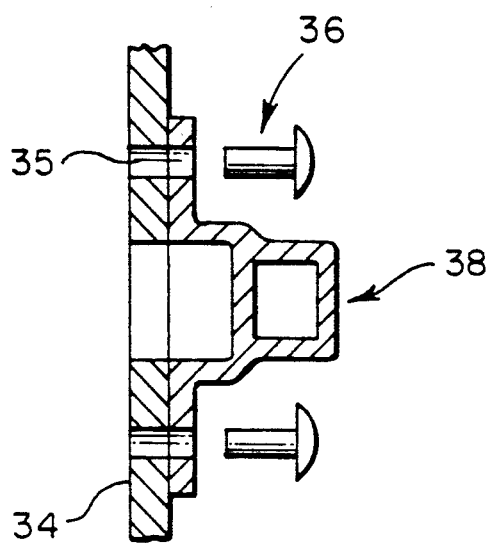
FIGS. 3A and 3B are cross-sectional views of interference fit fasteners fabricated from shape memory alloys which secure larger plate mounted nuts.
Figure 3B:
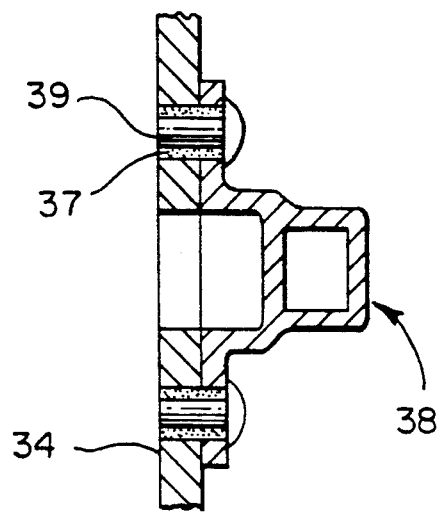

FIGS. 3A and 3B show a third embodiment, namely, a molded nut member 38 attached to a structural member 34 by rivets 36 made of shape memory material and retained in holes formed in member 34. The rivets are installed in the same manner as bushing 26. The rivet 36, fabricated from the discussed shape memory alloy material, becomes inserted within coaxially aligned holes 35 in members 34 and 38. In FIG. 3A the outer diameter of the rivet is less than the diameter of the holes 35 while the shape memory alloy material of the bushing remains below the critical transition temperature. This allows the rivet to be slipped into the holes. Then, the temperature of the shape memory alloy material is raised above the critical transition temperature so that the rivet expands, as indicated by reference numeral 39 and an interference fit results between the rivet and the holes. Expansion of the rivet causes cold working in the wall area around the holes is generally indicated as the interference region 37. This cold worked region enhances the fatigue life of the structural member 34 as does the existence of the interference fit rivet 26 in the cold worked hole.

Figure 4A:
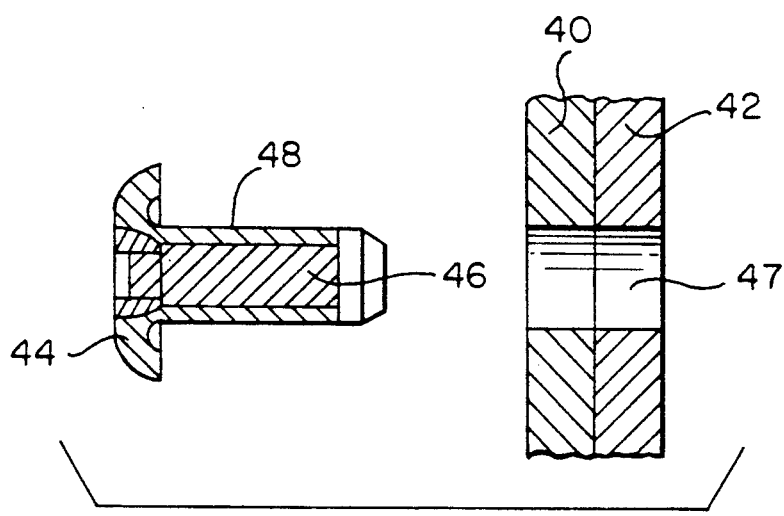
FIGS. 4A and 4B are sectional views illustrating a shape memory alloy blind interference fastener for use in soft and metal structures such as those fabricated from aluminum.
Figure 4B:
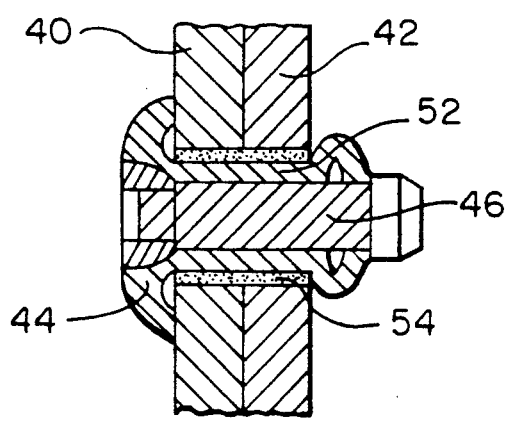

FIGS. 4A and 4B show a fourth embodiment wherein an anchor-type fastener 44 secures structural members 40 and 42 together. The tail portion becomes crimped as shown upon displacement of the central pin 46 by a conventional tool (not shown). The anchor sleeve 48 is fabricated from shape memory alloy material and becomes secured within a receiving hole by an installation procedure similar to that discussed in connection with bushing 26. The anchor sleeve 48, fabricated from the discussed shape memory alloy material, becomes inserted within coaxially aligned holes 47 in structural members 40 and 42. In FIG. 4A the outer diameter of the anchor sleeve is less than the diameter of the hole 47 while the shape memory alloy material of the anchor sleeve remains below the critical transition temperature. This allows the anchor sleeve to be slipped into the holes. Then, the temperature of the shape memory alloy material is raised above the critical transition temperature so that the anchor sleeve expands, as indicated by reference numeral 52 and an interference fit results between the anchor sleeve and the holes. Expansion of the anchor sleeve causes cold working in the wall area around the holes and is generally indicated as the interference region 54. This cold worked region enhances the fatigue life of the structural members 40, 42, as does the existence of the interference anchor sleeve 46 in the cold worked hole.

In general, the use of a shape memory alloy for a fatigue lifetime enhancement application would require the manufacture of a fastener (FIGS. 3A and 4A) or a bushing (FIG. 2A) from the alloy when it is in the austenitic condition. Subsequent processing in the martensitic state would involve deforming the material to reduce its size, such as by extruding or forging. The fastener or bushing then would be installed in the structure and allowed to heat and expand to a larger, precalculated size. The geometry of the fastener (e.g., head and tail design) and its subsequent installation (e.g., tightening or bucking) would be individually developed for each application. Also, process temperatures for initial deformation during fastener manufacture and, subsequently, during installation would be developed as required. The advantage of this approach would be the capability to install fasteners and bushings with a highly controlled interference over a wide range of sizes and a very uniform displacement through the thickness of the structure.

Figure 5:
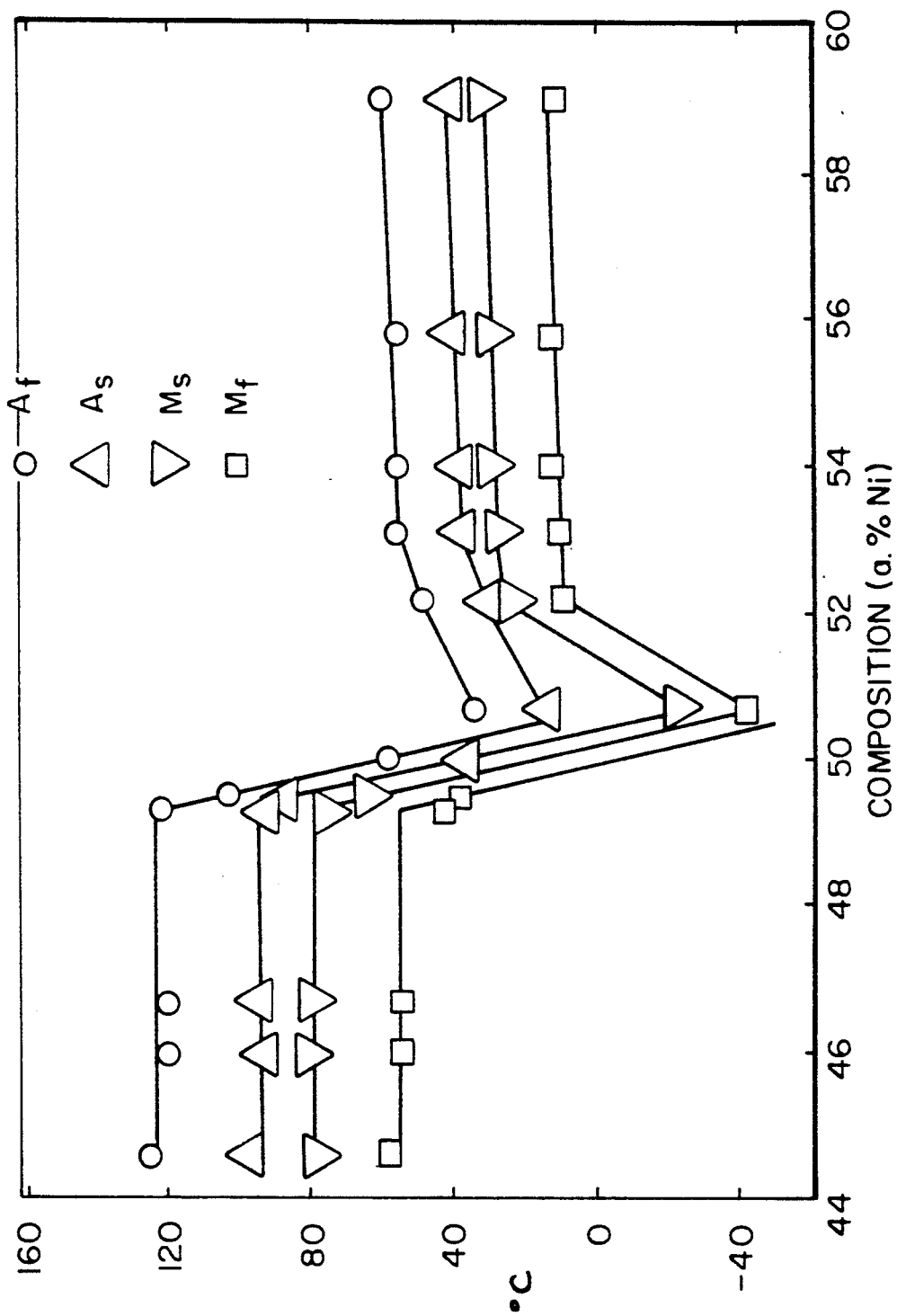
FIG. 5 is a graph showing several plots of transformation temperatures for shape memory alloys having different Ni percentage compositions.

FIG. 5 shows various plots of transformation temperatures on heating and cooling (°C.) as a function of composition. In the particular plot shown in FIG. 5, the composition varies as a percentage of Ni in a typical shape memory alloy, namely NiTi. The plotted points include the start of the austenitic phase ($A_s$), the finish of that phase $A_f$, the beginning of the martensitic phase state $M_s$ and the finish of that state $M_f$.

By virtue of the foregoing description, it will be appreciated that the foregoing invention offers a number of embodiments which enhance the fatigue life of structural members, a concept that is particularly useful in the fabrication and renovation of aircraft.

It should be understood that the invention is not limited to the exact details of construction shown and described herein for obvious modifications will occur to persons skilled in the art.

We claim:

1. A fatigue lifetime enhancing method for cold working holes in structural members comprising the steps:

stacking at least two apertured plates together, holes in each of the plates being aligned;

forming a generally cylindrical member of shape memory alloy;

positioning the member in aligned holes formed in the structural plates;

warming the member above its critical transitional temperature resulting in expansion of the member's outer diameter;

cold working the hole as the member expands;

cooling the member below its critical transitional temperature resulting in the contracting of the member's outer diameter; and removing the member from the holes in preparation of subsequent fastener insertion.

* * * * *